United States Patent [19]
Lanzisera

[11] Patent Number: 5,495,147
[45] Date of Patent: Feb. 27, 1996

[54] LED LIGHT STRING SYSTEM

[76] Inventor: Vincent A. Lanzisera, 38 Fernbrook Rd., Northboro, Mass. 01532

[21] Appl. No.: 228,442

[22] Filed: Apr. 15, 1994

[51] Int. Cl.$^6$ .................................................. H05B 37/00
[52] U.S. Cl. .................... 315/185; 315/200 R; 315/324; 315/312; 315/307
[58] Field of Search ..................... 315/307, 324, 315/185, 185 R, 200 A, 312, 185 S; 362/800, 806

[56] References Cited

U.S. PATENT DOCUMENTS

| | | | |
|---|---|---|---|
| 4,675,575 | 5/1987 | Smith et al. ............................. | 315/185 |
| 5,300,864 | 4/1994 | Allen, Jr. ........................ | 315/785 R X |
| 5,313,187 | 5/1994 | Choi et al. .......................... | 315/200 A |

*Primary Examiner*—Robert J. Pascal
*Assistant Examiner*—Reginald A. Ratliff
*Attorney, Agent, or Firm*—Kriegsman & Kriegsman

[57] ABSTRACT

A light string system includes a plurality of LED's connected in parallel and a regulated power supply for providing a constant current and a constant voltage to the LED's. The light system may be used for decorative, signaling and a variety of other applications.

2 Claims, 3 Drawing Sheets

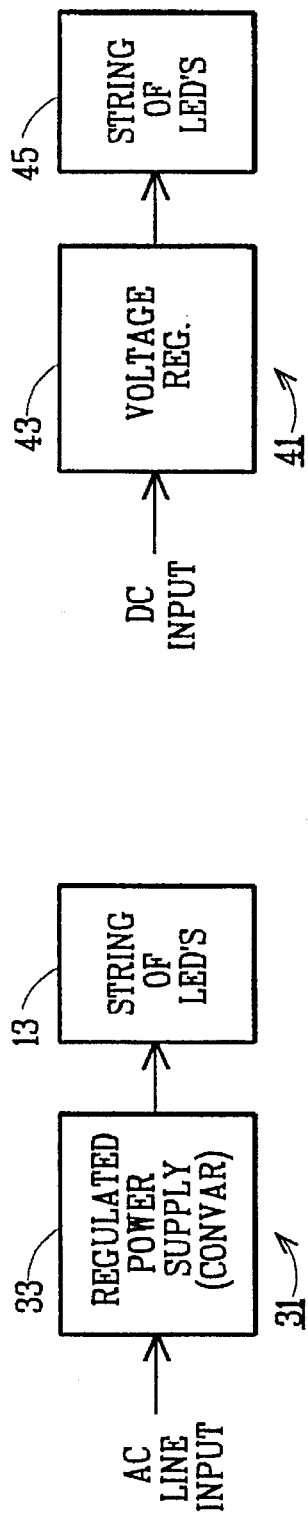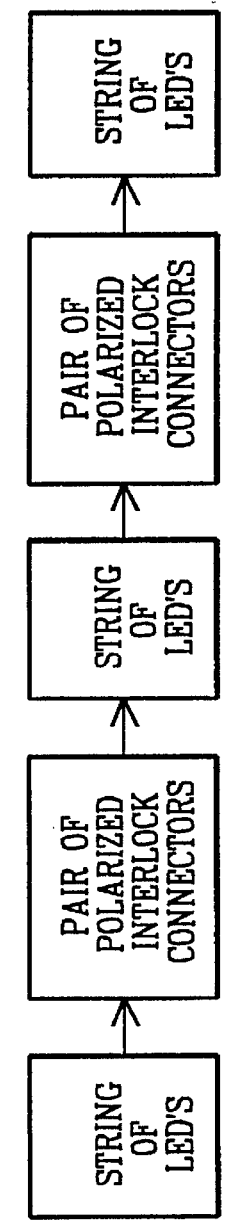

LED LIGHT STRING SYSTEM

BACKGROUND OF THE INVENTION

The present invention relates generally to a light string system and more particularly to a light string system employing light emitting diodes (LED's).

The light string system of this invention may be used for decorative purposes, such as, for example, Christmas lights, for signaling purposes, such as for example, traffic and/or pedestrian lights and a number of other applications.

In the past, Christmas tree lights have been made using for the most part either incandescent bulbs or neon lamps. These lights usually come in strings of 25, 50 or 100 bulbs or lamps attached together in a series arrangement. The strings can be plugged into one another up to an allowable power amount. Because the lights are arranged in series, a string of lights will go completely out when one light fails. This problem also occurs when a light loosens up on its socket as the user attaches the string or several strings of lights to a Christmas tree or other fixture.

Light strings of incandescent bulbs tend to burn out rapidly, use a great amount of energy at 115 VAC, and run excessively hot, thus having very unsafe features. A string of neon lamps also runs hot to obtain a good brightness level, uses a good amount of energy at 115 Vac, needs a high value resistor in series to limit the current, and because of its small diameter wiring and its general overall appearance many users get electrical shocks trying to change lamps with the power on.

Incandescent lamps consist of a resistive tungsten filament suspended by support wires with a vacuum inside a glass envelope. They are very susceptible to damage from mechanical shock or vibration and voltage spikes or transients. Generally, the higher the voltage-or, the lower the current at a given voltage the more fragile the filament. Choosing the lowest supply voltage for an incandescent lamp can minimize the effect of shock and vibration. The maximum life rating of incandescent lamps is usually on an average of 10,000 hours and can be increased slightly by derating the lamp and using it below its rated voltage thus diminishing its light output. Incandescent lamp life ratings should be taken with a grain of salt, since they are based only on shock free, vibration free, ripple free testing.

Incandescent lamps can be arranged in parallel as well as in series. If incandescent lamps are used that are rated at 5 volts with a current of 0.115 amps., one lamp would have a resistance of 44 ohms. With a source of 5 volts one lamp would draw a current of 115 milliamps, thus using 0.575 watts of power. If ten of such lamps are arranged in parallel, the total resistance to the source will be 4.4 ohms and the total current will be approximately 1.15 amps, thus using 5.75 watts of power. If 90 more of these same lamps are added, the total resistance to the source will be 0.44 ohms and the total current will be approximately 11.5 amps, thus using 57.5 watts of power. The source now has to supply more than 12 amps of current to feed 100 incandescent lamps at 5 volts. Heat, safety, energy and a unique source supply become big factors in operating such a circuit.

In U.S. Pat. No. 4,675,575 to Smith et al. there is disclosed a light string system having a plurality of mono-color or bi-color light-emitting diodes electrically connected thereto. Each light-emitting diode has a generally elongated, hollow envelope mounted thereover, and the envelope is substantially filled with light conducting optical spheres or even fragments. The envelope may be additionally filed with light-conducting epoxy, light-conducting liquid or light-conducting gas and sealed for improved light transmission and dispersion characteristics. The light-emitting diodes may include an improved base with light-emitting diode leads disposed approximately perpendicular to the axis of the envelope for bulb stability and for enabling the bulb to stand upright on the branches. Both the envelope and the optical spheres include light conducting glass or plastic material. The spheres may be either hollow or spherical and may be of a uniform or a mixed size. Additionally, the balls may be large for stacking in single file within the envelope or centrifuged to the sides of the envelope with the center devoid of spheres. The light emitting diodes may be adapted for use as Christmas tree strings and various AC and DC control circuits are provided for driving the light emitting diodes, for blinking effects, for alternating between two colors, for alternating between three colors, for improving the length of the string and uniformity of intensity of illumination and the like. In a preferred embodiment of the Christmas tree string of lights, a master trunk line and a plurality of limb lines are provided. The limb lines plug into or connect to predetermined locations along the master trunk line for ease of assembly, replacement and the like. this string uses a series-parallel configuration wherein the upper and lower portion of the master trunk line and the individual light-emitting diodes within each limb line are connected in series while the limb line sets are connected in parallel with each other for enabling more lights to be illuminated with less power, for increasing the uniformity of illumination along the length of the string, and for minimizing light outage due to bulb burnout.

It is an object of this invention to provide a new and improved light string system.

It is another object of this invention to provide a light string system using LED's.

SUMMARY OF THE INVENTION

An LED light string system constructed according to teachings of the present invention comprises a string of LED's and a regulated power supply. The string of LED's comprises a plurality of LED's interconnected in parallel. The regulated power supply provides a constant current and a constant voltage to the LED's. The LED light string system may be used for decorative, signaling and a variety of other applications.

Various features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention and it is to be understood that other embodiments may be utilized and that structural changes may be made without departing from the scope of the invention. The following detailed description is therefore, to be taken in a limiting sense, and the scope of the present invention is best defined by the appended claims.

BRIEF DESCRIPTION OF THE DRAWINGS

In the drawings wherein like reference numerals represent like parts:

FIG. 3 is a block diagram of a modification of the light string system shown in FIG. 1;

FIG. 4 is a block diagram of another modification of the light string system shown in FIG. 1;

FIG. 5 is a block diagram of a plurality of strings of LED's connected in series.

DETAILED DESCRIPTION OF PREFERRED EMBODIMENT

Figure 1:
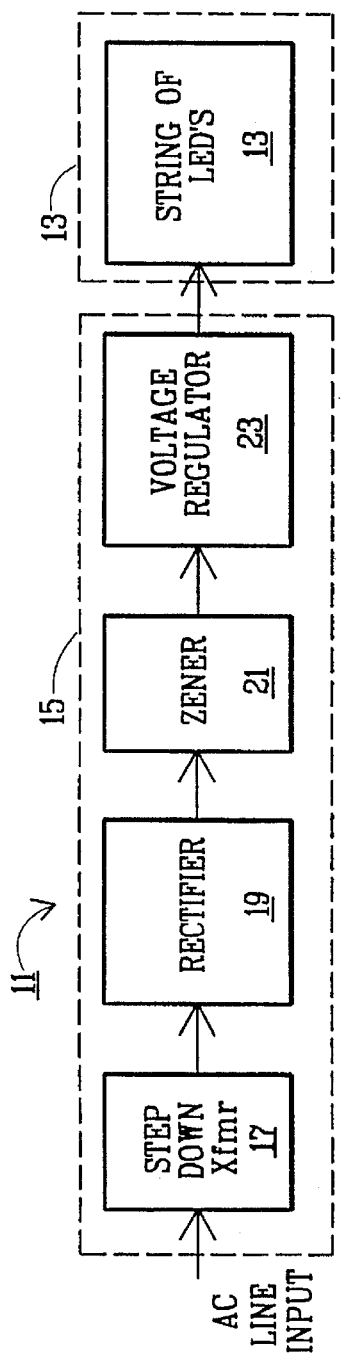
FIG. 1 is a block diagram of one embodiment of an LED light string system according to this invention.

The present invention is directed to a light string system using LED's.

Light emitting diodes (LED's) are devices that emit light by an application of an electric current across a semiconductor p-n junction. LEDs are current operated devices, not voltage operated devices. The drive current through an LED lamp must be controlled. This is typically done by placing a current limiting resistor in series with the LED lamp. The voltage drop across an LED is a function of the "drive current" through the device. An AC current source can be used to drive an LED as long as the peak current does not exceed the forward current ratings for the device. A rectifier diode should be placed in series with an LED to prevent excessive reverse biasing by the AC drive signal. The typical operating life of an LED is in excess of 100,000 hours (approximately 11 years). The operating voltage of an LED is between about 1.5 VDC and 3.5 VDC and the operating current of an LED is between about 2 and 30 ma. The operating life and the light output are a function of the LED junction temperature. Power dissipation is derated as the ambient temperature increases above a certain point, i.e. 50 degrees C. (122 degrees F.). Power derating is usually achieved by reducing the forward drive current to a level specified for safe operation at a particular ambient temperature. LED lamps are usually rated at operating temperatures from −20 degrees C. to +100 degrees C.

According to this invention the "series resistor" to the LED is eliminated and replaced with a voltage regulator that supplies a constant current and a constant voltage.

For instance, assume the source is a battery such as a 9 volt nickel-cadmium (C size) having a capacity of 2500 milliamps per hour. Add a LM 117 HVH (National Semiconductor) adjustable voltage regulator capable of supplying in excess of 1500 milliamps over a 1.2 V to 57 V output range. If the voltage regulator is set to 1.8 volts, a constant current of 10 milliamps for each LED would result. With only one LED in parallel with the source (the voltage regulator) the LED will draw 10 milliamps and this device will have a resistance of 1890 ohms and a total of 10 milliamps will flow in the in the circuit thus using 0.018 watts of power. If ten LEDs are placed in parallel, each LED will draw 10 milliamps of current for a total of 100 ma (total resistance to the source is 18 ohms (4) thus using 0.18 watts of power. If 90 more LEDs were added to this circuit for a total of 100 LEDs, the total current that would be drawn would be 1 amp. (100 LED's, the total current that would be drawn would be 1 amp. (1000 ma) total resistance to the source 1.8 ohms, thus using 1.8 watts of power (see FIG. 2). This is considerably less that the 11.5 amps and 57.5 watts used by the 100 incandescent lamps above with a 5 volt source.

Since the regulator can supply 1500 ma of current at 1.8 volts, 50 more LED's can be added to the above circuit to give a total of 150 LED's in parallel. The total current will then be 1500 ma. Total resistance to the source 1.2 ohms, thus using 2.7 watts of power, still a significant difference in energy consumption. Since the voltage regulator as the source can supply constant current at a constant voltage, then the LEDs that are in parallel will always be current limited by the source.

Referring now to FIG. 1 there is shown a block diagram of an LED light string system constructed according to this invention, the LED light string system being identified by reference numeral 11.

LED light string system 11 includes a string of LED's 13 and a regulated power supply 15.

Regulated power supply 15 includes a step down transformer 17 which receives an unregulated 110 volt AC from a line (not shown) and lowers the voltage to about 5 volts AC. The output from step down transformer 17 is rectified to DC by rectifier 19. A zener diode 21 coupled to the output of rectifier 19 insures that the DC voltage does not exceed 5 volts. The output of zener diode 21 is fed into a voltage regulator 23 which outputs a constant current and a constant voltage. The output of voltage regulator 23 is fed into string of LED's 13.

Figure 2:
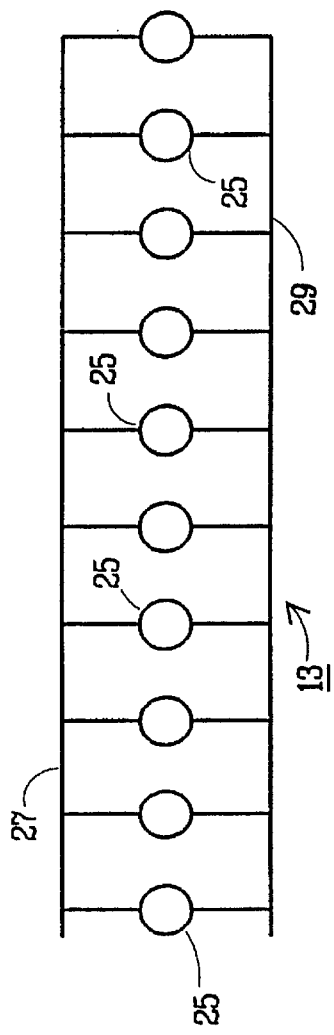
FIG. 2 is a more detailed representation of the string of LED's shown in FIG. 1.

String of LED's 13, which is shown in more detail in FIG. 2 comprises a plurality of LED's 25 connected in parallel to a pair of wires 27 and 29, such as AWG wire.

The maximum number of LED's 25 in string 13 is dependent on the current output of voltage regulator 23 and the amount of current each LED 25 draws. Thus, if voltage regulator 23 is an LM 117 HVH (National Semiconductor) adjustable voltage regulator set to output 1500 milliamps and each LED 25 draws 10 milliamps, the maximum number of LED's in string 13 is 150. In FIG. 2, there are 10 LED's 25 shown in string 13, it being understood that this particular number is for illustrative purposes only.

In FIG. 3 there is shown another light string system 31 according to this invention. Light string system 31 differs from LED light string system 11 in that the regulated power supply 33 is an AC to DC CONVAR.

In FIG. 4 there is shown another LED light string system 41 according to this invention in which the regulated power supply is in the form of a voltage regulator 43 which receives power from a DC source such as a battery.

Instead of a single string of LED's as in FIG. 2, the LED's as in FIG. 2, the LED's 25 may be in the form of a system 45 made up of a plurality of strings 13 connected in series by polarized connectors as shown in FIG. 5, the total number of LED's 25 being within the 150 maximum.

Figure 6:
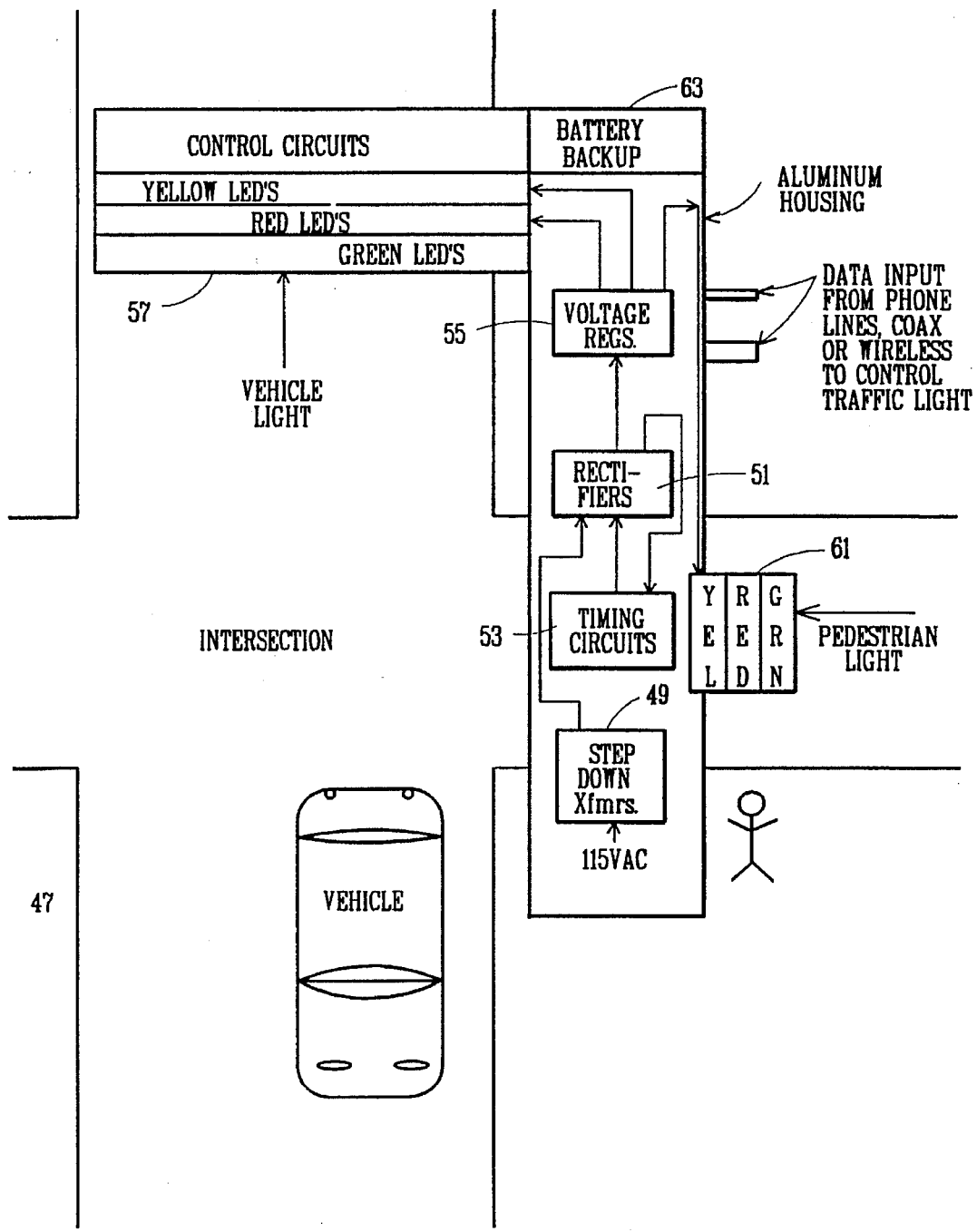
FIG. 6 is a block diagram of a traffic/pedestrian light system using the invention.

A traffic light/pedestrian light combination according to this invention is shown in FIG. 6 and identified by reference numeral 47.

System 47 includes step down transformers 49 rectifiers 51, timing circuits 53, voltage regulators 55 vehicle lights 57, control circuits 59, pedestrian lights 61 and a backup battery 63.

What is claimed is:

1. An LED light string system comprising:
   a. a first string of LED's, said first string of LED's comprising a plurality of LED's connected in parallel, and
   b. a regulated power supply for providing a constant current and a constant voltage to said first string of LED's, said regulated power supply receiving power from an AC line input and comprising a step down transformer for lowering an AC line input voltage to between about 3 volts AC and 5 volts AC, a rectifier for rectifying the output voltage from the step down transformer, a voltage regulator coupled to the output of the rectifier for providing a constant voltage and constant current output, and a zener diode coupled between the rectifier and the voltage regulator for limiting the voltage fed into the voltage regulator from the rectifier.

2. An LED light string system comprising:
   a. a first string of LED's, said first string of LED's comprising a plurality of LED's connected in parallel,
   b. a regulated power supply for providing a constant current and a constant voltage to said first string of LED's said regulated power supply receiving power form an AC line input and comprising a step down transformer for lowering an AC line input voltage to between about 3 volts AC and 5 volts AC, a rectifying for rectifier the output voltage from the step down transformer, and an adjustable voltage regulator coupled to the output of the rectifier for providing a constant voltage and constant current output, and
   c. means for electrically connecting the string of LED's to the regulated power supply, said means comprising a polarized interlock connector.

* * * * *